US008794540B2

(12) United States Patent
Margolies et al.

(10) Patent No.: US 8,794,540 B2
(45) Date of Patent: Aug. 5, 2014

(54) WIRE ARC SPRAY SYSTEM USING COMPOSITE WIRE FOR POROUS COATING, AND RELATED METHOD

(75) Inventors: Joshua Lee Margolies, Niskayuna, NY (US); Surinder Singh Pabla, Greer, SC (US)

(73) Assignee: General Electric Company, Schenectady, NY (US)

( * ) Notice: Subject to any disclaimer, the term of this patent is extended or adjusted under 35 U.S.C. 154(b) by 795 days.

(21) Appl. No.: 12/685,852

(22) Filed: Jan. 12, 2010

(65) Prior Publication Data

US 2011/0171393 A1 Jul. 14, 2011

(51) Int. Cl.
| | | |
|---|---|---|
| B05B 1/24 | (2006.01) |
| B05C 5/04 | (2006.01) |
| B23K 9/04 | (2006.01) |
| B23K 1/015 | (2006.01) |
| B23K 11/24 | (2006.01) |
| B23K 3/00 | (2006.01) |

(52) U.S. Cl.
USPC .............. 239/83; 239/81; 239/84; 219/76.14; 219/85.14; 219/121.53

(58) Field of Classification Search
CPC .............. B05B 1/24; B05C 5/04; B23K 9/04; B23K 1/015; B23K 11/24; B23K 3/00
USPC ............. 239/79–85, 318, 434, 633, 209, 594, 239/340; 427/449, 236, 446; 219/76.14, 219/76.16, 85.14, 85.18, 121.47, 121.53
See application file for complete search history.

(56) References Cited

U.S. PATENT DOCUMENTS

| | | | | |
|---|---|---|---|---|
| 3,546,415 | A | * | 12/1970 | Marantz ...................... 219/76.14 |
| 4,095,081 | A | * | 6/1978 | Ashman ..................... 219/76.16 |
| 4,148,971 | A | | 4/1979 | Kawano et al. |
| 4,396,473 | A | * | 8/1983 | Hughes et al. ................ 205/512 |
| 4,961,973 | A | | 10/1990 | Molnar |
| 4,987,003 | A | | 1/1991 | Schuster et al. |
| 4,992,337 | A | | 2/1991 | Kaiser et al. |
| 5,714,205 | A | * | 2/1998 | Marantz et al. ............... 427/449 |
| 5,964,405 | A | * | 10/1999 | Benary et al. ................... 239/84 |
| 5,990,445 | A | | 11/1999 | Ogasawara et al. |
| 6,190,740 | B1 | | 2/2001 | Rogers |

(Continued)

FOREIGN PATENT DOCUMENTS

EP 0439179 A1 7/1991

OTHER PUBLICATIONS

Chalaftris, Georgios, European Patent Application 11150394.2-1215, Extended European Search Report, Jun. 7, 2011, 11 pages.

(Continued)

*Primary Examiner* — Justin Jonaitis
(74) *Attorney, Agent, or Firm* — Hoffman Warnick LLC; Ernest G. Cusick

(57) ABSTRACT

A wire arc spray system use at least one first wire and second wire that include a composite wire including a first material at a core region thereof and a cladding including a second material surrounding the core region. A controller controls operation to propel heated material created by the arcing of the first wire and the second wire at the arc point to a surface to be coated. A wire arc spray methodology for creating a porous metal coating with all-metal wires is also provided.

12 Claims, 3 Drawing Sheets

(56) References Cited

U.S. PATENT DOCUMENTS

| | | |
|---|---|---|
| 6,245,390 B1 * | 6/2001 | Baranovski et al. ......... 427/449 |
| 6,398,125 B1 | 6/2002 | Liu et al. |
| 6,513,728 B1 | 2/2003 | Hughes et al. |
| 7,165,946 B2 | 1/2007 | Nava et al. |
| 2003/0175440 A1 | 9/2003 | Molnar et al. |
| 2005/0242069 A1 | 11/2005 | Stager |
| 2006/0105191 A1 | 5/2006 | Holdik et al. |
| 2007/0278108 A1 | 12/2007 | Rosenzweig et al. |

OTHER PUBLICATIONS

European Patent Application 11150394.2-1215, Extended European Search Report, Jul. 18, 2011, 2 pages.

TAFA Twin Wire Arc vs. Plasma, 2009, 3 pages, Issue Y10429, Praxair Technology, Inc.

* cited by examiner

US 8,794,540 B2

WIRE ARC SPRAY SYSTEM USING COMPOSITE WIRE FOR POROUS COATING, AND RELATED METHOD

BACKGROUND OF THE INVENTION

The disclosure relates generally to coating techniques and systems, and more particularly, to a wire arc spray system using a composite wire for creating a porous coating and a related method.

Metal abradable coatings include porous metal coatings and are used in a variety of industries. For example, metal abradable coatings may be applied to an inside of a casing of a gas turbine or a compressor of a jet engine to create abradable seal coatings that act on moving parts to create precise tolerances for sealing. Currently, metal abradable coatings are applied by plasma spray or combustion spray using powders that include a metal and a material that can be burned out such as a polymer (e.g., polyester) or other low melting point material. In some case, a solid lubricant such as boron nitride is also employed. The materials that are burned out are some times referred to as fugitive phase material. Once the composite materials are applied to a surface, they are heat treated to burn out the of the fugitive phase materials, resulting in a porous, abradable coating of the metal material on the surface. Another approach to creating metal abradable coatings is to bond the fugitive phase materials to the metal powder with a low temperature adhesive that will burn off during heat treatment. Abradable coatings can be expensive to create due to the processes used and non-portability of the equipment and materials used. The composite powders used in the plasma spray process also suffer from reproducibility problems and sole source limitations on the fugitive phase materials leading to expensive composite powder prices.

Wire arc spraying is another approach for coating a surface with a very dense, non-porous material. Porous metal coatings have, however, been produced from wire arc spraying by using a sacrificial metal wire, e.g., of zinc, with a dissimilar metal wire, e.g., of nickel, and electro-chemically etching out the sacrificial metal to leave porous metal behind. This application generates porous metal advantageous for, e.g., fuel cell electrodes, but not abradable seal coatings. Wires having aluminum cladding and an alumina core have also been employed for creating anti-skid coatings. In this case, the alumina does not melt (melting point 2072° C.) with the aluminum (melting point 660.32° C.) and is not removed, but is trapped in the coating, resulting in a very high surface roughness.

Other efforts to create abradable coatings generate complex honeycomb structures on the surface with various fillers in the cells.

BRIEF DESCRIPTION OF THE INVENTION

A first aspect of the disclosure provides a wire arc spray system comprising: a propelling gas source for delivering a propelling gas to an arc point; a first wire delivery apparatus for delivering a first wire to the arc point; a second wire delivery apparatus for delivering a second wire to the arc point, wherein at least one of the first wire and the second wire includes a composite wire including a first material at a core region thereof and a cladding including a second material surrounding the core region; a source of the first wire positioned to provide the first wire to the first wire delivery apparatus; a source of the second wire positioned to provide the second wire to the second wire delivery apparatus; an electrical source for creating a first electrical polarity in the first wire and a second electrical polarity that is opposite to the first electrical polarity in the second wire; and a controller for controlling the electrical source, the propelling gas source and the first and second wire delivery apparatuses to propel heated material created by the arcing of the first wire and the second wire at the arc point to a surface to be coated.

A second aspect of the disclosure provides a composite wire for use with a wire arc spray system, the composite wire comprising: a low melting point material at a core region thereof and a cladding including a metal surrounding the core region, the low metal point material having a melting point less than that of the metal, wherein the low melting point material includes a polymer in the form of a powder having particles having a size of from approximately 1 nanometer to approximately 100 nanometers.

A third aspect of the disclosure provides a method comprising: delivering a first all-metal wire to an arc point, the first all-metal wire having a first electrical polarity therein; delivering a second all-metal wire to the arc point, the second all-metal wire having a second electrical polarity therein that is opposite to the first electrical polarity; transmitting a propelling gas through the arc point to propel heated material created by the arcing of the first all-metal wire and the second all-metal wire at the arc point to a surface to be coated; and controlling at least one of a voltage of the arc point, a current of the arc point, a volume of the propelling gas, a pressure of the propelling gas and a distance between the arc point and the surface to create a porous metal coating on the surface.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
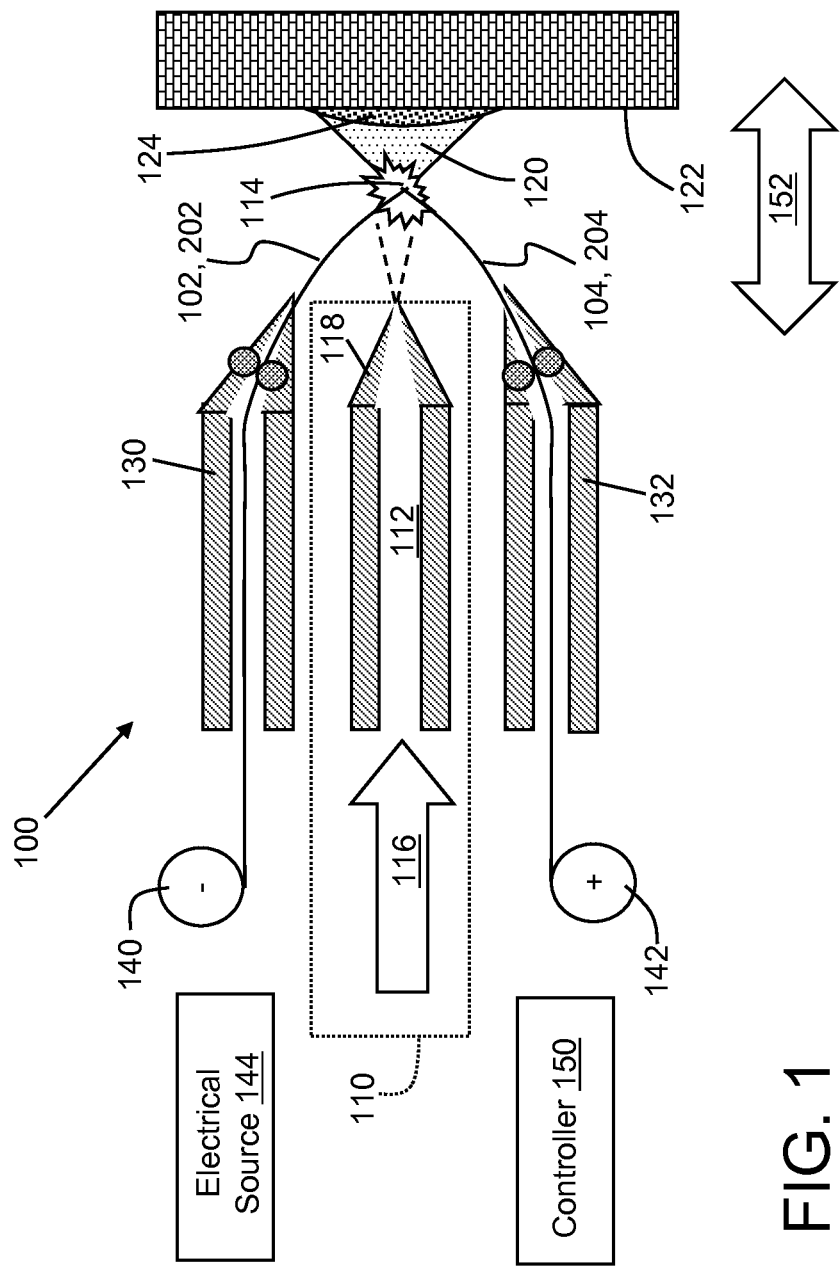
FIG. 1 shows a schematic cross-sectional view of embodiments of a wire arc spray system according to the invention.

Referring to the drawings, FIG. 1 shows a schematic cross-sectional view of a wire arc spray system 100 according to embodiments of the invention. While system 100 includes many features similar to conventional devices, wire(s) 102, 104 may be different than conventional single material wires or conventional composite wires. As will be described in greater detail herein, wires 102, 104 allow creation of a porous metal coating 124 on a surface 122 that conventional wire arc spray systems are incapable of creating.

System 100 includes a propelling gas source 110 for delivering a propelling gas 112 to an arc point 114. Arc point 114 is a location at which wires 102, 104 come into contact and electrically arc based on electric current therein, creating a heated material 120, which is transmitted to surface 122 by propelling gas 112. As used herein, "heated material" refers to material propelled toward surface 122, which may be simply heated and/or in any partial or wholly melted form. In one embodiment, propelling gas 112 includes a compressed gas, e.g., argon, that propels heated material 120 from arc point 114 to surface 122 to be coated with porous metal coating 124. In this case, a source 116 (indicated by an arrow) may include a tank of compressed gas. However, propelling gas 112 may also take the form of a combustion-based gas such as may be created by a high velocity oxygen fuel (HVOF) process using hydrogen gas or a liquid fuel like kerosene. Other combustion processes may include, for example, combustion of oxygen and acetylene or oxygen and propylene. Typically, these combustion-based processes are not used with a wire arc spray system but rather with a powder material supply because the process does not provide adequate time to melt materials sufficiently to create a dense coating. In the present case, however, a dense coating is not desirable. Consequently, a combustion-based gas may be employed in a wire arc spray system. In this case, source 116 may include a combustion chamber. Propelling gas source 110 may also include a nozzle 118 that may take any form now known or later developed to deliver propelling gas 112 in a manner appropriate for propelling heated material 120 to surface 122.

System 100 also may include a first wire delivery apparatus 130 for delivering first wire 102 to arc point 114, and a second wire delivery apparatus 132 for delivering second wire 104 to arc point 114. Although illustrated as simple tubular members with wire pulling pulleys, delivery apparatuses 130, 132 may take any now known or later developed structure for delivering a wire or other rope-like structure to a desired location. For example, each apparatus 130, 132 may include any variety of guides, posts, reels, wheels, pulleys, motors, interacting wire grippers, etc., to move wires 102, 104 to arc point 114. A source 140 of first wire 102 is positioned to provide the first wire to first wire delivery apparatus 130, and a source 142 of second wire 104 is positioned to provide the second wire to second wire delivery apparatus 132. Sources 140, 142 may take any now known or later developed manner of holding wire, e.g., a spool or reel.

System 100 also includes an electrical source 144 for creating a first electrical polarity, e.g., −, in first wire 102 and a second electrical polarity, e.g., +, that is opposite to the first electrical polarity in second wire 104. Each electrical polarity does not necessarily have to exhibit the same voltage and/or current. Electrical source 144 may be coupled to an end of each wire 102, 104 in any now known or later developed manner so as to create the requisite electrical polarity therein, e.g., coupled to an internal end of each wire on a spool. It is also understood that while one electrical source 144 is illustrated, two electrical sources, one for each wire, may also be employed.

System 100 also includes a controller 150 for controlling electrical source 144, propelling gas source 110 and first and second wire delivery apparatuses 130, 132 to propel heated and/or melted material 120 created by the arcing of first wire 102 and second wire 104 at arc point 114 to surface 122 to be coated. In addition, system 100 may include any now known or later developed mover(s) 152 for controlling a distance between arc point 114 and surface 122 to be coated such as a robotic arm, a motor, a mechanical linkage, etc. Controller 150 may control mover(s) 152. Controller 150 may include any now known or later developed industrial controller capable of the above-stated functions. Since such controllers 150 are very well known in the art, no further description is required.

Figure 4:
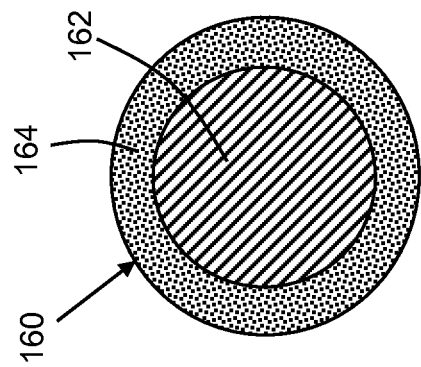
FIG. 4 shows a cross-sectional view of a third embodiment of a composite wire according to the invention.
Figure 3:
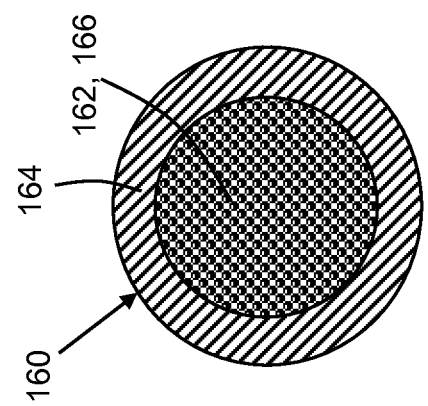
FIG. 3 shows a cross-sectional view of a second embodiment of a composite wire according to the invention.
Figure 2:
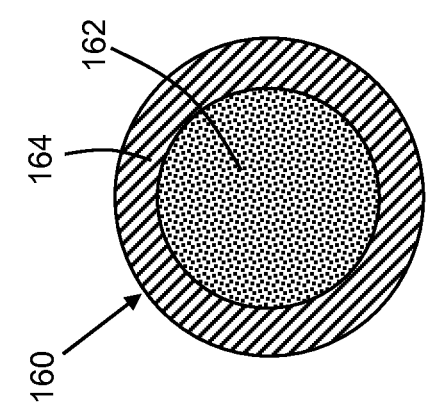
FIG. 2 shows a cross-sectional view of one embodiment of a composite wire according to the invention.

Turning to FIGS. 2-4, details of first and second wires 102, 104 will now be described. In one embodiment, one or both of first wire 102 and second wire 104 may include a composite wire 160 including a first material 162 at a core region thereof and a cladding including a second material 164 surrounding core region 162. Where only one wire 102, 104 includes a composite wire, the other wire is an all-metal wire. In one embodiment, first material 162 includes a low melting point material having a melting point less than that of second material 164. For example, in one embodiment, as shown in FIG. 2, first material 162 may include a polymer and second material 164 may include a metal. For example, first material 162 may include a polyester, and the metal may be one or more of nickel and cobalt. In another embodiment, shown in FIG. 3, the polyester includes a powder having particles 166 having a size of approximately 1 nanometer to approximately 100 nanometers. In another example, first material 162 may include a relatively low melting point metal such as aluminum, zinc or tin, and second material 164 may include a higher melting point material such as nickel, cobalt and/or other higher melting point metals. The melting point of the listed materials are approximately as follows: aluminum 660° C., zinc 419° C., tin 232° C., nickel 1453° C. and cobalt 1495° C. The melting point of polyester varies depending on the chemical formulation thereof, but is lower than the second materials' listed above. In an alternative embodiment, shown in FIG. 4, first material 162 may include a metal and second material 164 may include a polymer, such as those listed above.

In operation, wires 102, 104 are heated at arc point 114 and first and second materials 162, 164 are heated to melt at least a substantial portion of wires 102, 104 such that the heated material 120 is transmitted to surface 122 by propelling gas 112. Subsequently, surface 122 can be heat treated at a high temperature (range dependent on material to be removed) to melt or vaporize any remaining first material 162 out of coating 124, leaving a porous coating of second material 164. For example, a temperature of approximately 1000° C. may be used to vaporize aluminum but leave a porous nickel. The porosity of coating 124 can be determined by, for example, the diameter of first material 162, and process parameters used to deposit coating 124 such as, but not limited to: a feed rate of wire(s) 102, 104, a distance between arc point 114 and surface 122, and propelling gas 112 flow volume and pressure. In addition, porosity can be controlled by the chemistry of wire(s) 102, 104, which can be modified in terms of constituents and internal core region pattern to produce a reproducible abradable coating for both high and low temperature applications.

Figure 5:
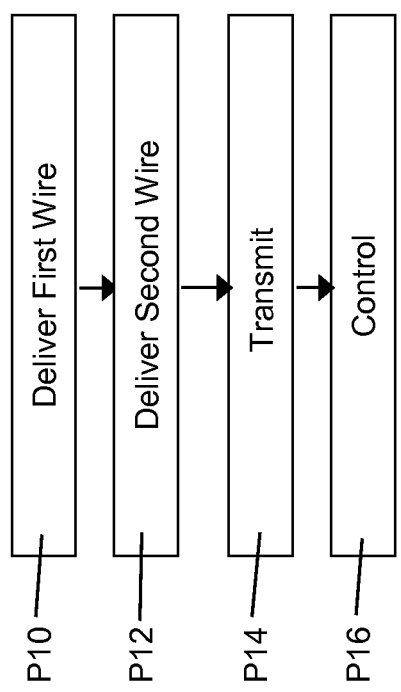
FIG. 5 shows a flow diagram of a method according to embodiments of the invention.

Referring to the flow diagram of FIG. 5 in conjunction with FIG. 1, in other embodiments according to the invention, wire arc spray system 100 may be employed using all-metal wires 202, 204 to create a porous abradable coating 124. In particular, in a process P10, first wire delivery apparatus 130 delivers a first all-metal wire 202 to arc point 114, and in process P12, second wire delivery apparatus 132 delivers a second all-metal wire 204 to arc point 114. First all-metal wire 202 has a first electrical polarity therein and second all-metal wire 204 has a second electrical polarity therein that is opposite to the first electrical polarity, i.e., as created by electrical source 144. In process P14, propelling gas source 110 transmits propelling gas 112 through arc point 114 to propel heated and/or melted material 120 created by the arcing of first all-metal wire 202 and second all-metal wire 204 at arc point 114 to surface 122 to be coated. However, in contrast to conventional wire arc spraying, controller 150 controls at least one of a voltage of arc point 114, a current of arc point 114, a volume of propelling gas 112, a pressure of propelling gas 112 and a distance between arc point 114 and surface 122 to create a porous metal coating 124 on surface 122. Voltage and current of arc point 114 may be controlled via electrical source 144. Volume and pressure of propelling gas 112 may be controlled, for example, by valving in the case where the gas is compressed gas, by controlling the combustion process in the case where the gas is created from a combustion process or by other mechanisms known in the art. A distance of arc point 114 from surface 122 can be controlled by mover(s) 152. A porosity of coating 124 can be determined by, for example, the types of metals used, the diameter of first material (metal) 162, and the process parameters used to deposit coating 124 such as, but not limited to: a feed rate of wire(s) 202, 204, a distance between arc point 114 and surface 122, and propelling gas 112 flow volume and pressure. In any event, this approach relies on wire arc system 100 having a very low velocity and ability to produce large molten droplets that will produce porous coating 124. One illustrative application uses a nickel (Ni) wire and an aluminum (Al) wire, and the resulting coating would be a Ni matrix, NiAl (hard) intermetallic particles, formed during the arc, with soft Al regions. Some abradable embodiments may include a hard phase to serve to "cut" the ductile coating in a rub/abrasion event.

An advantage that may be realized in the practice of some embodiments of the described systems and techniques is that composite wire 160 offers a lower cost, more reproducible process to apply abradable coatings that is also portable for field use as well as in the factory or service shop compared to conventional composite powder spray systems. In addition, wire is less expensive to manufacture (perhaps ⅔ the cost), is more portable and is more consistent and reproducible than metal/polymer powder blends. Thus, coating 124 can be more reliably applied. In the FIG. 5 embodiment, the elimination of the need to perform a post coating burn-out, a step currently used with the plasma spray processes and the FIGS. 2-4 embodiments, reduces feedstock costs and reduces time required to produce coating 124.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A wire arc spray system comprising:
a composite wire including a core region having a first material and a cladding surrounding the core region, wherein the cladding includes a metal, and the first material includes a polymer;
a first wire delivery apparatus physically connected to the composite wire and configured to deliver the composite wire to an arc point;
a second wire delivery apparatus configured to deliver a non-composite wire to the arc point;
a propelling gas source for delivering a propelling gas to the arc point;
an electrical source configured to create a first electrical polarity in the composite wire and a second electrical polarity in the non-composite wire, the second electrical polarity being opposite to the first electrical polarity;
a mover adapted to control a distance between the arc point and a surface to be coated; and
a controller configured to provide instructions to at least one of the mover, the electrical source, the propelling gas source and the first and second wire delivery apparatuses to propel molten droplets of a heated material on to the surface to be coated,
wherein the heated material is created by an arcing of the composite wire and the non-composite wire at the arc point, and
wherein the propelling of the molten droplets of the heated material creates a porous metal coating on the surface to be coated.

2. The wire arc spray system of claim 1, wherein the controller is further configured to provide instructions to substantially vaporize the polymer by adjusting at least one of: a voltage level at the arc point, a current level at the arc point, a volume of the propelling gas, a pressure of the propelling gas, a feed rate of the composite wire, a feed rate of the non-composite wire, and the distance between the arc point and the surface to be coated.

3. The wire arc spray system of claim 1, wherein the non-composite wire is a metal wire and the first material further includes a polyester in the form of a powder having particles having a size of approximately 1 nanometer to approximately 100 nanometers.

4. The wire arc spray system of claim 3, wherein the propelling gas is a combustion-based gas.

5. The wire arc spray system of claim 4, wherein the propelling gas source includes a combustion chamber.

6. The wire arc spray system of claim 5, wherein the controller is further configured to adjust a volume and a pressure of the propelling gas flow by controlling a combustion process in the combustion chamber.

7. The wire arc spray system of claim 4, wherein the combustion-based gas further includes a gas selected from the group consisting of: hydrogen, oxygen, acetylene, propylene, and kerosene.

8. The wire arc spray system of claim 1, wherein the first material further includes a metal selected from the group consisting of: aluminum, zinc, and tin.

9. The wire arc spray system of claim 1, wherein the controller is further configured to provide instructions to control a porosity of the metal coating by adjusting at least one of: a voltage level at the arc point, a current level at the arc point, a volume of the propelling gas, a pressure of the propelling gas, a feed rate of the composite wire, a feed rate of the non-composite wire, and the distance between the arc point and the surface to be coated.

10. The wire arc spray system of claim 1, wherein the core region is configured in a pattern adapted to provide the porous metal coating.

11. The wire arc spray system of claim 1, wherein the polymer has a low melting temperature relative to the cladding and the non-composite wire.

12. The wire arc spray system of claim 1, wherein the first material is a solid.

\* \* \* \* \*